US008677202B1

(12) United States Patent
Joshi (10) Patent No.: US 8,677,202 B1
(45) Date of Patent: *Mar. 18, 2014

(54) GENERATING A MOVING AVERAGE (71) Applicant: Marvell International Ltd., Hamilton (BM)

(72) Inventor: Kiran Joshi, Mountain View, CA (US)

(73) Assignee: Marvell International Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/769,407

(22) Filed: Feb. 18, 2013

Related U.S. Application Data (63) Continuation of application No. 12/404,495, filed on Mar. 16, 2009, now Pat. No. 8,381,053.

(60) Provisional application No. 61/043,524, filed on Apr. 9, 2008.

(51) Int. Cl.
*G06F 11/00* (2006.01)

(52) U.S. Cl.
USPC .......................... 714/746; 714/796; 708/445

(58) Field of Classification Search
None
See application file for complete search history.

(56) References Cited

U.S. PATENT DOCUMENTS

| | | |
|---|---|---|
| 5,448,508 A | 9/1995 | Ono et al. |
| 5,563,746 A | 10/1996 | Bliss |
| 6,304,133 B1 | 10/2001 | Sato |
| 6,396,788 B1 | 5/2002 | Feyh et al. |
| 7,231,001 B2 | 6/2007 | Aziz |
| 7,466,766 B2 | 12/2008 | Aziz |
| 2004/0190646 A1 | 9/2004 | Aziz |
| 2008/0065962 A1 | 3/2008 | Song et al. |
| 2008/0165444 A1 | 7/2008 | Zafer |

*Primary Examiner* — Scott Baderman
*Assistant Examiner* — Jason Bryan (57) ABSTRACT

Devices, systems, methods, and other embodiments associated with generating a moving average are described. In one embodiment, a method calculates, using at least an accumulator, an average value of M sequential data values is calculated, where M is an integer. The M sequential data values are delayed before passing a delay output. The method detects a data value with an error in the M sequential data values that are delayed and controls the accumulator to correct the average value of the M sequential data values as a function of the error.

20 Claims, 8 Drawing Sheets

GENERATING A MOVING AVERAGE

CROSS REFERENCE TO RELATED APPLICATIONS

This disclosure is a continuation of U.S. application Ser. No. 12/404,495 filed on Mar. 16, 2009 now U.S. Pat. No. 8,381,053, which claims benefit under 35 USC §119(e) to U.S. provisional application Ser. No. 61/043,524 filed on Apr. 9, 2008, which is incorporated herein by reference in its entirety.

BACKGROUND

Electronic devices, such as disk drives, store and retrieve data on a storage medium. Communications systems transmit and receive data via a communication medium. The electronic devices and communication systems use similar techniques to encode data for storage and transmission. The data is encoded into a digital format to allow efficient manipulation of the data by the disk drives and the communication systems.

The storage device and communication system transmission devices do not directly store or transmit digital data. Instead, these devices store or receive analog signals that represent the digital data. For example, disk drives encode digital information as analog magnetic flux changes. Similarly, communication receivers traditionally receive an analog electromagnetic waveform from a communication channel. Certain shapes of analog electromagnetic waveforms represent different values of digital data received by the receiver from a transmitter.

The retrieved or received analog signals are decoded to reproduce the encoded digital data. A circuit that reads or receives the encoded data and reproduces the original digital data is referred to as a read channel. A read channel in a disk drive includes a magnetic read head that senses the magnetic flux changes. The read head produces electric current to represent the digital data as an analog waveform. The continuous analog waveform is decoded to recover the digital data.

In an ideal theoretical environment, each magnetic flux change of a magnetic disk represents a bit value of zero or one. In practice, the physical proximity of one recorded bit to the next adjacent bit tends to cause interference between the adjacent bits. This interference eventually leads to digital bit errors when the analog signal is converted to a digital signal. Similar interference issues affect a communication receiver. Other interference waveforms and noise may alter portions of the original analog electromagnetic waveform as the waveform is transmitted and received. The interference waveforms and noise may inject errors in the data represented by the waveform. The problem of errors being injected in analog data is exacerbated as communication speed or storage density increases. A better way to decode data that may contain errors may be desired.

SUMMARY

In one embodiment, a method calculates, using at least an accumulator, an average value of M sequential data values is calculated, where M is an integer. The M sequential data values are delayed before passing a delay output. The method detects a data value with an error in the M sequential data values that are delayed and controls the accumulator to correct the average value of the M sequential data values as a function of the error.

In one embodiment, a method calculates, on a per clock basis, an average value of a sliding window of M sequential data values, where M is an integer. A data value is detected that has an error. The data value is in the sliding window of M sequential data values. The method corrects the average value of the sliding window as a function of the error.

In one embodiment, the error is compensated for after N clock periods of receiving the data value with the error, where N is less than M.

In one embodiment, the average value is corrected as a function of the error by removing the data value with the error from the sliding window of M sequential data values.

In another embodiment, the average value is corrected as a function of the error by replacing the data value with the error with an average value of data values of the sliding window of M sequential data values that do not contain an error.

In one embodiment, the method branches, from a stream of data samples, a most recent M data samples into a first branch and a second branch. The most recent M data samples branched to the first branch are the same as the most recent M data samples branched to the second branch. The most recent M data samples of the first branch are accumulated to a first accumulator of a moving average filter. The most recent M data samples of the second branch are delayed using a delay line. A delay line output is generated by delaying a data sample of the most recent M data samples of the second branch. The delay line output is delayed by M data samples in the delay line. The delay line output is subtracted from the first accumulator. The method determines an input data sample contains an error. The input data sample containing the error in the delay line is adjusted in parallel to delaying the most recent M data samples. A moving average output is provided that is a function of a first accumulator output. The moving average is used as the average value of the sliding window and the first accumulator output is based, at least in part, on the adjusted input data sample.

An embodiment includes an apparatus implemented with branch logic to branch a sequential stream of data values to a first branch and a second branch. Accumulator logic is to accumulate the sequential stream of data values on the first branch and is to generate an accumulator value that spans M sequential data values. A single delay logic is to delay the sequential stream of data values on the second branch. The single delay logic is to pass a data value received to a single delay output in a sequential process based, at least in part, on a clock. Multiple delay logic is to receive the single delay output and to hold the single delay output for M clock cycles before passing the single delay output to a multiple delay output. Event detection logic is to detect a corrupted single delay output. Correction logic is to control the accumulator logic to adjust a moving average output of the accumulator logic as a function of the corrupted single delay output.

In one embodiment, the event detection logic is to zero out the corrupted single delay output. The event detection logic is to input the zeroed out corrupted single delay output into the multiple delay logic instead of the corrupted single delay output.

In one embodiment, the apparatus comprises an AND gate with a first input connected to the single delay logic and a second input connected to the event detection logic. An AND gate output is connected to the multiple delay logic. The AND gate is to zero out the corrupted single delay output.

In another embodiment, the event detection logic is to detect the corrupted single delay output while the corrupted single delay output is in the single delay logic.

In one embodiment, the correction logic controls the corrupted single delay output to be subtracted from the accumulator logic.

In one embodiment, the event detection logic is to detect that the single delay output contains an error and to correct the error to produce a corrected single delay output.

In one embodiment, the event detection logic is to mark the corrupted single delay output. The accumulator logic is to adjust the moving average output as a function of the marked corrupted single delay output.

In one embodiment, the event detection logic is to replace the corrupted single delay output with an average of other data values in the multiple delay logic.

The other data values in the multiple delay logic are data values that are not corrupted.

In one embodiment, the apparatus implements a read channel in a chip.

An embodiment includes an apparatus implemented with accumulator logic to accumulate a sequential string of data values to produce a moving average value. Delay line logic is to delay a copy of the sequential string of data values for M delay units. The accumulator logic subtracts a delay line logic output from the moving average value. Error correction logic is to detect and correct a data value with an error in the sequential string of data values. The error correction logic replaces a corresponding data value in the delay line logic with the corrected data value. Moving average logic is to calculate a moving average based, at least in part, on an accumulator output value and the corrected data value.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are example systems, methods, and other embodiments associated with generating a moving average for recovering digital data. An analog signal is processed by an analog to digital converter to produce a sequence of digital values. An example digital value may contain eight bits and may include parity bits. The sequence of digital data values is input to a moving average filter to calculate a moving average value. The moving average value is a value that is used to further process the sequence of digital data values.

In one embodiment, a moving average value is generated by detecting and compensating for errors in a corrupted digital value. A corrupted digital value is used to contribute to the moving average value for several clock cycles when the moving average spans a fixed width of sequential digital values. In one embodiment, the moving average value is improved by detecting the corrupted digital value in the first clock cycle after the corrupted digital value is received. In one embodiment, the corrupted digital value is detected by a check of the parity bits. The corrupted digital value is corrected and the corrected value is applied to the moving average value on the second clock cycle. The corrupted digital value can be applied to the moving average value during the first clock cycle. However, when the corrected digital value replaces the corrupted digital value for subsequent clock cycles, the moving average value becomes based in part on the corrected digital average value.

In one embodiment, error detection logic and error correction logic is electrically connected between an analog to digital converter and a moving average filter. The error detection logic and error correction logic detects and corrects errors before the errors reach the moving average filter. However, placing the error detection logic and error correction logic in front of the moving average filter may increase the latency of the moving average value.

In one embodiment, an apparatus is implemented with error detection logic and error correction logic electrically connected in parallel to delay logic in a moving average filter and an accumulator in the moving average filter. The apparatus has the ability to correct errors in a digital input data without introducing latency into a moving average filtering operation. An accumulator calculates a moving average value as a function of input digital values and a delay logic output. The error detection logic checks a digital value on the first clock cycle after the delay line logic receives the digital value. A corresponding data value in the delay logic is adjusted when an error is detected and corrected by the error correction logic. The moving average value calculated by the accumulator is also adjusted with the correct data value. Even though the moving average value has an error for a clock cycle before the error is detected, the moving average is not affected by the error in other clock cycles. For example, when the delay logic delays M data values, the moving average value will be correct for M−1 clock cycles when the error is detected and corrected in one cycle.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

"Logic", as used herein, includes but is not limited to hardware, firmware, a non-transitory medium that stores executable instructions on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

Figure 1:
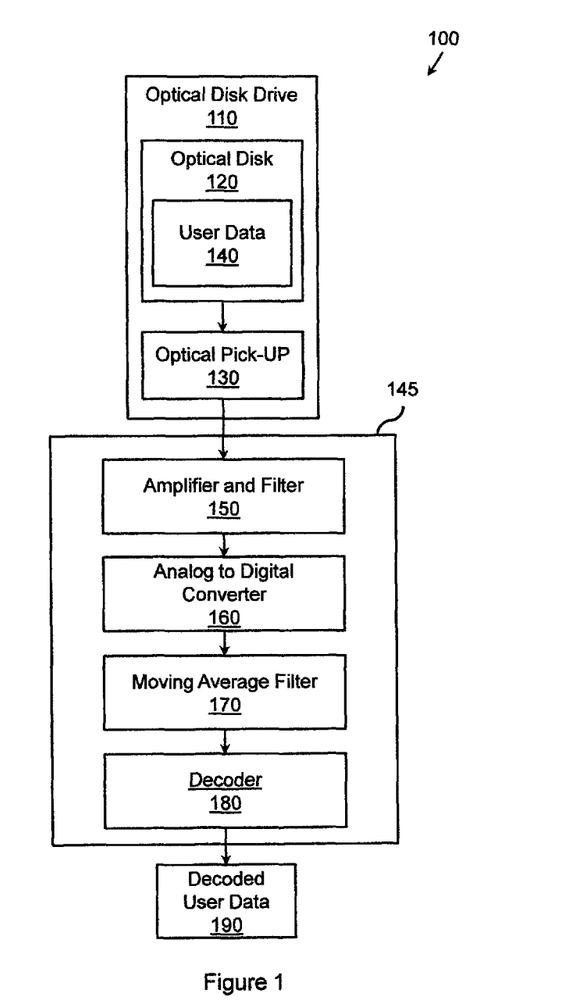
FIG. 1 illustrates one embodiment of a system associated with generating a moving average.

FIG. 1 illustrates one embodiment of a system 100 associated with processing analog data with a moving average filter. The system 100 reads data from an optical disk drive. The system may be implemented with other devices that process analog data such as magnetic disk drives, communication devices that transmit analog signals, and so on.

The system 100 is implemented with an optical disk drive 110. The optical disk drive 110 is implemented with an optical disk 120 and an optical disk pick-up 130. User data 140 is stored on the optical disk 120. The optical pick-up 130 reads user data 140 from the optical disk 120 with analog sensors. The user data 140 read by the optical pick-up is in an analog form. The optical disk drive 110 presents the user data 140 in the analog form to a read channel 145.

The read channel 145 is implemented with an amplifier and filter 150, an analog to digital converter 160, moving average filter 170, and a decoder 180. The amplifier and filter 150 amplifies and filters the user data 140 to remove unwanted noise. The filtered user data 140 is input to an analog to digital converter 160 to transform the user data 140 into digital data. The digital data is input to the moving average filter 170.

The moving average filter 170 processes the digital data to provide a filtered signal to the decoder 180. The moving average filter 170 removes unwanted high frequency time domain noise components from the digital data. The decoder 180 identifies encoded data in a digital stream of data received from the moving average filter 170. The identified encoded data is decoded by the decoder 180 to produce decoded user data 190.

Figure 2:
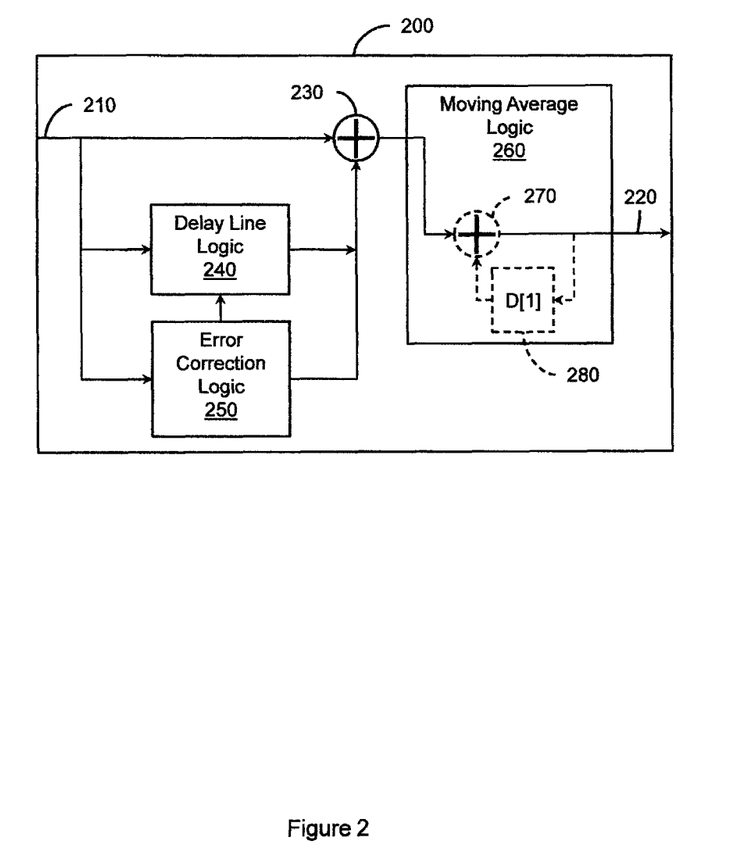
FIG. 2 illustrates one embodiment of an apparatus associated with generating a moving average.

FIG. 2 illustrates one embodiment of an apparatus 200 associated with generating a moving average. The configuration of the apparatus 200 may correspond to that of a moving average filter. The apparatus 200 receives data values on an input 210 and generates a moving average that is sent to an output 220. The data values are digital data values. The apparatus 200 can correct errors in the digital input data without introducing latency into the moving average filtering. The apparatus 200 is implemented with accumulator logic 230, delay line logic 240, error correction logic 250, and moving average logic 260.

A moving average filter operates on a window of data values of length M. The most recent M data values are accumulated by the accumulator 270. The accumulator 270 keeps a running sum of the most recent M data values. A new data values is added to an existing accumulation value and the oldest sample is removed from the accumulator value when a new data value arrives at the input 210. A particular data value affects M sequential moving average outputs.

A data value will affect the output for the M clock cycles after the data value arrives at the input 210 when one data value arrives per clock cycle. At the M+1 cycle, the error sample is removed by the operation of the apparatus 200 as described below. The output 220 is error free at the M+1 cycle, provided that data values 2 through M−1 were error free. The apparatus 200 has the ability to remove the effect of data values with an error from a moving average output before the data value with an error is a most resent M data value. The error is removed in less than M clock cycles of operation.

The accumulator logic 270 accumulates a sequential string of data values. The accumulator logic 270 accumulates the window length M of sequential data values. The accumulator logic 270 may calculate an accumulated value of data by summing the M values together. The accumulator logic 270 may be implemented in digital logic using a digital adder and flip-flops to store the accumulated value. The accumulator logic 270 may be implemented with other logic.

The delay line logic 240 delays a copy of the sequential string of data values for M delay units. The delay units may be clock cycles. The delay line logic 240 may be implemented with back-to-back flip-flops. The back-to-back flip-flops store data values. The flip-flop data values are shifted between flip-flops at periodic clock cycle intervals. The data values may be shifted in the flip-flops at regular clock cycle periods. The accumulator logic 230 subtracts a delay line logic 240 output from the accumulated value. The delay line logic 240 output is the data value that has been shifted M cycles. A person of ordinary skill in the art will realize that there are other ways to implement a delay logic The error correction logic 250 detects and corrects a data value with an error in the sequential string of data values. The data value with the error may be detected by detecting a parity bit error, detecting an overflow bit, or another error detection technique. The error correction logic 250 corrects errors with a process that may be different for different types of applications. For example, a data sample with an error may simply be converted into zero. In another application an average value of the last M data values replaces the data value with the error. The error correction logic 250 replaces a corresponding data value in the delay line logic 240 with the corrected data value. The error correction logic 250 also supplies a corrected data value to the accumulator logic 230. The accumulator logic 230 adjusts the accumulator value calculated by accumulator logic 270 to account for the error.

The moving average logic 260 calculates a moving average value. The moving average value is based, at least in part, on the accumulator logic 230 output value. When data has been corrected, the moving average value is based, at least in part, on the corrected data value. In another embodiment, the moving average value is based, at least in part, on an accumulator logic 230 output value and the corrected data value.

In one embodiment, the moving average logic 260 calculates the moving average value with second accumulator logic 270 and single delay logic 280. The second delay logic

280 delays the moving average value at the output 220 by one cycle. The delayed moving average value travels a feedback path to the second accumulator 270. The moving average value is calculated by the second accumulator 270 accumulating the accumulator output value produced by the accumulator logic 230 and the delayed moving average value.

In one embodiment, the error correction logic 250 is inserted between an analog to digital converter and the input 210. In this configuration, errors may be corrected before reaching the accumulator logic 230 and the delay line logic 240. However, the latency of the output 200 is increased by the latency of the error correction logic 250. The latency is increased whether or not a data value has an error. This additional latency is not acceptable in some applications.

Apparatus 200 does not add latency when creating a moving average output. No latency is added because the error correction logic 250 operates in parallel with the accumulator logic 230, accumulator logic 270 and the delay line logic 240. However, apparatus 200 may have a moving average value affected by a data value with an error. The moving average value is affected until the data value with an error is detected and corrected. As discussed above, if M is much larger than the time needed to correct the error, then the moving average value may not be significantly affected. The apparatus 200 with error correction logic 250 and delay line logic 240 in parallel with the accumulator 270 and 230 improves over serial error detection and correction. In the parallel configuration, the output moving average value will not have additional latency regardless of whether a data sample has an error. The parallel apparatus 200 preserves the latency in the moving average filter and corrects errors in less than M cycles. In one embodiment, the parallel apparatus 200 is useful in latency critical applications.

Figure 3:
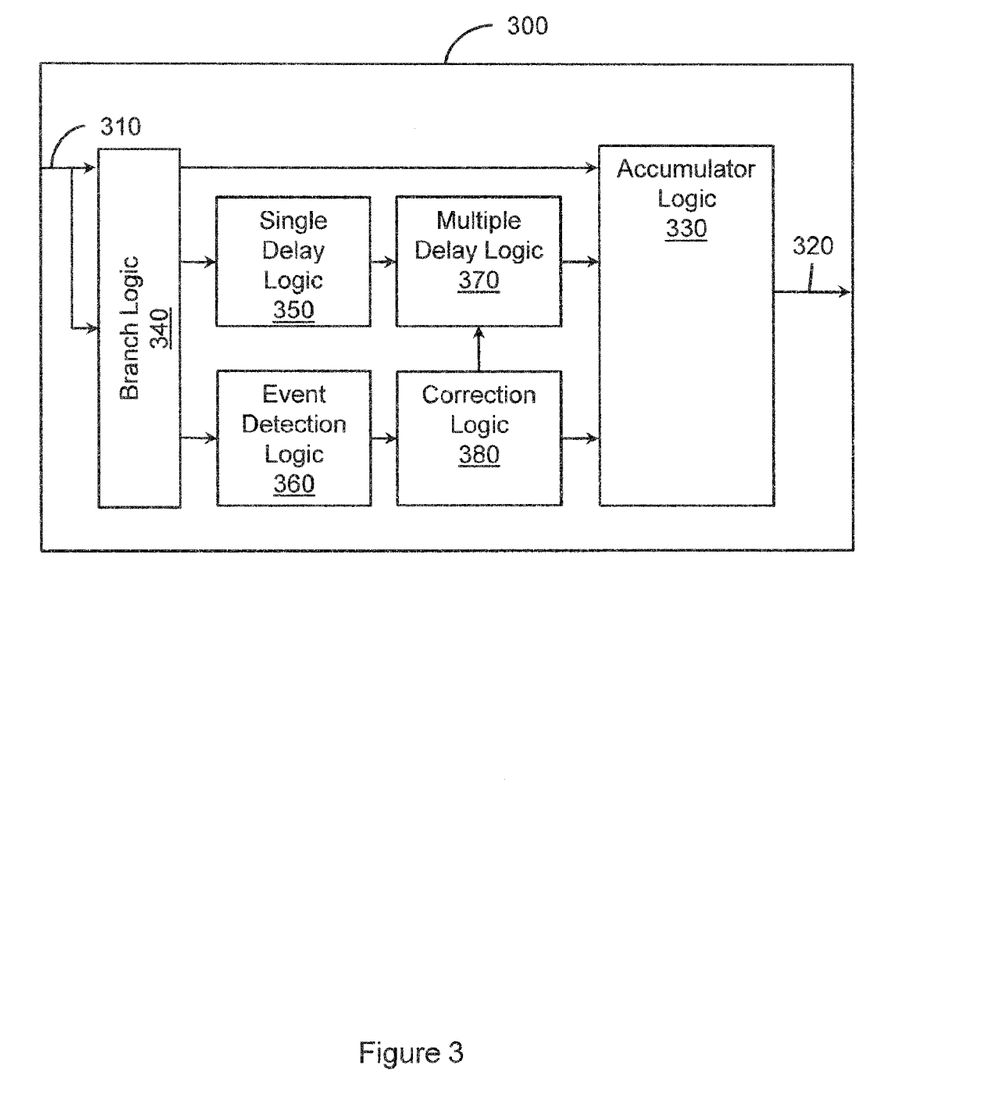
FIG. 3 illustrates another embodiment of an apparatus associated with generating a moving average.

FIG. 3 illustrates another embodiment of an apparatus 300 associated generating a moving average. The configuration of the apparatus 300 may correspond to that of a moving average filter. The apparatus 300 receives data values on an input 310 and generates a moving average that is sent to an output 320. The data values are digital data values. Errors data values input to the apparatus 300 are corrected without introducing latency into the moving average filter. The apparatus 300 is implemented with accumulator logic 330, branch logic 340, single delay logic 350, event detection logic 360, multiple delay logic 370, and correction logic 380. In one embodiment, the apparatus 300 is implemented as part of a read channel in a chip. The chip is a set of micro-miniaturized electronic circuits fabricated on a piece of semiconductor material.

The branch logic 340 splits a sequential stream of data values into two branches. The sequential stream of data values is the same in both the first branch and the second branch. A first branch goes to the accumulator logic 330. A second branch goes to the single delay logic 350. In one embodiment, a third branch goes to the event detection logic 360 to allow event detection logic 360 to directly monitor the data values.

The accumulator logic 330 accumulates the sequential stream of data values on the first branch. The accumulator logic 330 also generates an accumulator value that spans M sequential data values. The span of M sequential data values is similar to the window length M of sequential data values discussed above.

The single delay logic 350 delays the sequential stream of data values on the second branch. The single delay logic 350 passes a data value received to a single delay output in a sequential process based, at least in part, on a clock used to clock the delay logic. In one embodiment, the single delay logic 350 may be a register that stores an input data value one clock cycle before outputting the input data value to the single delay output on the next clock cycle.

The multiple delay logic 370 receives the single delay output and holds the single delay output for M clock cycles before passing the single delay output to a multiple delay output. The multiple delay logic 370 receives the single delay output at periodic clock intervals. In one embodiment, the multiple delay logic 370 is a string of back-to-back registers. At regular clock intervals, the data samples are clocked from one register to the next as sequence the data sample is received. A data sample is clocked out of the last register and input to the accumulator logic when the data sample reaches the multiple delay output. The data sample is discarded when the data sample is no longer in the span of M sequential data values.

The event detection logic 360 detects a corrupted single delay output. The corrupted single delay output has a data quality below a first threshold value. The first threshold value may be a threshold number of bit errors, bit voltage levels, parity errors, and other values related to data quality. In one embodiment, the event detection logic 360 detects the corrupted single delay output while the corrupted single delay output is in the single delay logic 350. In another embodiment, the event detection logic 360 marks the corrupted single delay output. The accumulator logic 330 adjusts the moving average output as a function of the marked corrupted single delay output.

The correction logic 380 controls the accumulator logic 330 to adjust a accumulation value as a function of the corrupted single delay output. In one embodiment, the correction logic 380 controls the corrupted single delay output to be subtracted from the accumulation value.

In one embodiment, the event detection logic 360 detects that the single delay output contains an error. The error is a bit error, a parity bit error, and/or another error. The event detection logic 360 corrects the error to produce a corrected single delay output. In another embodiment, the correction logic 380 corrects the error by applying an error code correction (ECC) and/or a low density parity check (LDPC). The corrected single delay output is input to the multiple delay logic 370 instead of the data value that contains an error. The correction logic 380 also instructs the accumulator logic 330 to adjust the moving average output as a function of the corrected single delay output.

In one embodiment, the event detection logic 360 detects the single delay output that contains the error as a function of detecting an overflow bit. In another embodiment, the event detection logic 360 replaces the corrupted single delay output with an average of other data values in the multiple delay logic 370 that are not corrupted. The event detection logic 360 may detect a corrupted data value with other techniques and the correction logic 380 may correct the corrupted data value with other techniques.

Figure 4:
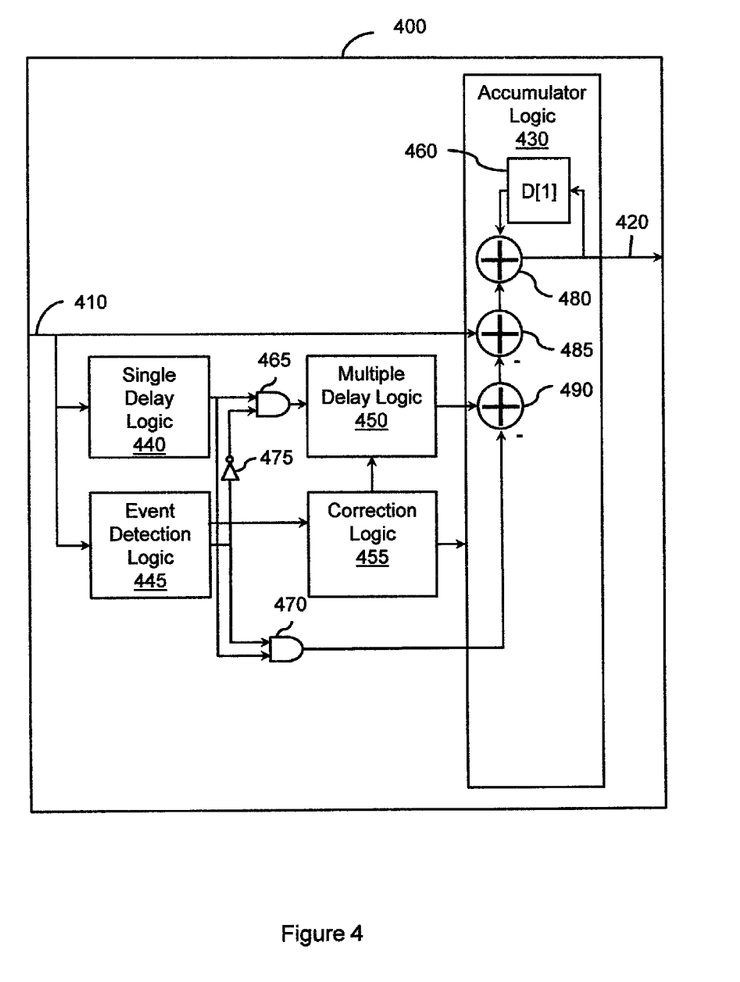
FIG. 4 illustrates another embodiment of an apparatus associated with generating a moving average.

FIG. 4 illustrates one embodiment of an apparatus 400 associated with generating a moving average. The configuration of the apparatus 400 may correspond to that of a moving average filter. The apparatus 400 receives data values on an input 410 and generates a moving average that is sent to the output 420. The data values are digital data values. The apparatus 400 has the ability to correct errors in the digital input data 410 without introducing latency into the moving average filtering operation. The apparatus 400 is implemented with accumulator logic 430, single delay logic 440, event detection logic 445, and multiple delay logic 450. In one embodiment, the accumulator logic 430, single delay logic 440, event detection logic 445, and multiple delay logic 450 operate similar to the accumulator logic 330, single delay logic 350, event detection logic 360, and multiple delay logic 370 discussed above with reference to FIG. 3.

The event detection logic 445 detects corrupted data in the single delay logic 440 as discussed above. The apparatus 400 zeroes out the corrupted data and inputs the zeroed out value into the multiple delay logic 450 instead of the corrupted data. In one embodiment, the corrupted data is subtracted from the moving average so the corrupted data does not contribute to the moving average calculated by the accumulator logic 430.

In one embodiment, a corrupted single delay output is zeroed out with a first AND gate 465, a second AND gate 470, and an inverter 475. The first AND gate 465, the second AND gate 470, and the inverter 475 are connected in the apparatus 400 as shown in FIG. 4. The event detection logic 445 outputs a high value when a corrupted single delay output is detected. The high value is inverted by the inverter 475 that then drives a low value into the multiple delay logic 450. Notice that one AND gate 465 has been drawn in FIG. 4. In actual implementation, there may be a number of first AND gates 465 equal to how many bits correspond to a data value. The zeroed out corrupted single delay output is input to the multiple delay logic 450 instead of the corrupted single delay output.

In one embodiment, the correction logic 455 controls the accumulator logic 430 to adjust the moving average output when a corrupted single delay output is detected. The moving average output is controlled by subtracting the single delay output that contains the error from the accumulator value. The correction logic 455 controls the accumulator logic 430 to add the corrected single delay output to the accumulator value.

A high value is also driven to second AND gate 475 when a corrupted data value is detected. The second AND gate 475 inputs the corrupted single delay output to be removed from the moving average when the event detection logic 445 inputs a high value to the second AND gate 475. The number of second AND gates 475 may be equal to the number of bits in a corrupted single delay output, even though one second NAND gate 475 is shown in FIG. 4.

The event detection logic 445 detects data values corresponding to overflow. An earlier logic may have set a corresponding overflow bit when the earlier logic determined the data value was not valid. The overflow bit is associated with a data value. Data values corresponding to an overflow condition may be zeroed out as discussed above so that the overflow data values do not contribute to the moving average.

In one embodiment, the accumulator logic 430 calculates the moving average value with single output delay logic 460, first accumulator logic 480, second accumulator logic 485, and third accumulator logic 490. The single output delay logic 460 delays the moving average value at the output 420 by one cycle. The delayed moving average value travels a feedback path to the first accumulator logic 480. Other values are combined in the second accumulator 485 and the third accumulator 490 as shown in FIG. 4. The other values may include the multiple delay output, the zeroed out corrupt data value, and the input data value. These three values are combined by the second accumulator logic 485 and the third accumulator logic 490. The combined values are input to the first accumulator logic 480.

Figure 5:
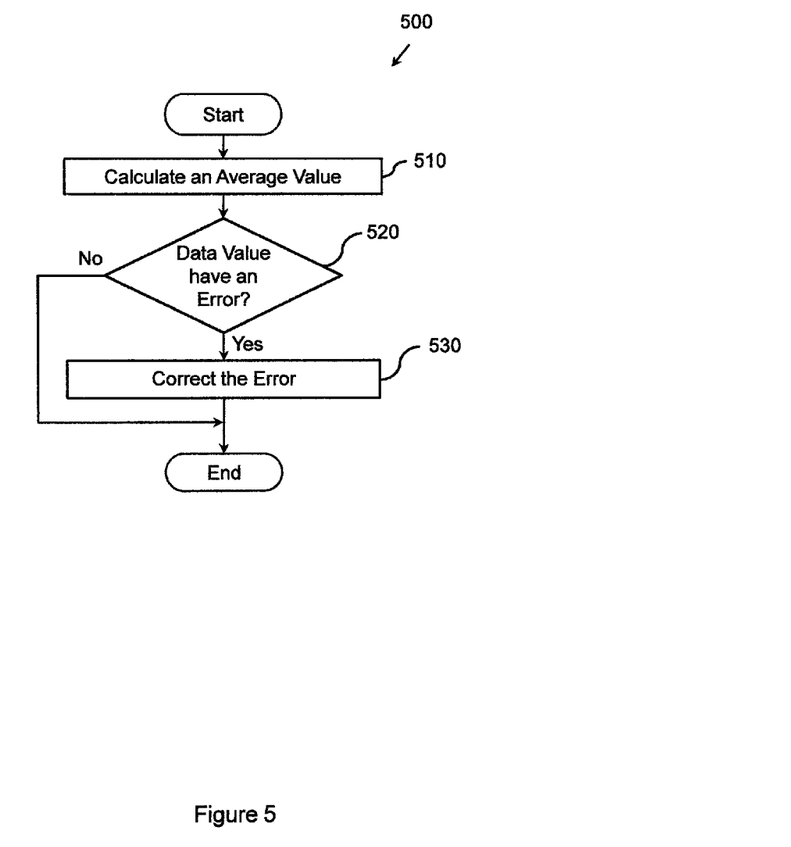
FIG. 5 illustrates one embodiment of a method associated with generating a moving average.

FIG. 5 illustrates an embodiment of a method 500 associated with generating a moving average. The method 500 may perform some of the operations that apparatuses 200, 300, and 400 (FIGS. 2, 3, and 4) perform. The method 500 improves the generation of a moving average by removing or correcting corrupted data values from a moving average value. The corrupted data values are removed early after being received so that the corrupted data values do not contributed significantly to the moving average value. The method 500 may be part of process of processing analog data.

The method 500 calculates an average value at 510. The average value is calculated for a sliding window of M sequential data values, where M is an integer. In one embodiment, the moving average value is calculated with digital logic once per clock cycle. One data value enters the sliding window per clock cycle and one data value exits the sliding window per clock cycle.

A data value with an error in the sliding window of M sequential data values is detected at 520. The data value with an error may be detected by detecting an overflow bit that is set and that corresponds to the data value with an error. The overflow bit may have been set by a process prior to the data value being presented to the method 500. For example, the data value may be a value that caused overflow in an analog to digital converter. The error may be detected by checking parity bits associated with the data value or by another algorithm that detects data values with errors.

The average value is corrected at 530 before the data value with the error exits the sliding window. In one embodiment, the average value is corrected, at 530, by removing the data value with the error from the sliding window of M sequential data values. The average value is compensated for by using the remaining data values in the sliding window to calculate the average value. In another embodiment, the average value is corrected, at 530, by replacing the data value with the error with an average value of the remaining data values in the sliding window of M sequential data values that do not contain an error.

In one embodiment, the error is compensated for after N clock periods of receiving the data value with the error, where N is less than M. The error affects the average value for the N clock periods, so that the average value is unaffected by the error for MN clock periods. The error is corrected soon after the data value associated with the error enters the moving window so that the error does not significantly contribute to the moving average.

Figure 6:
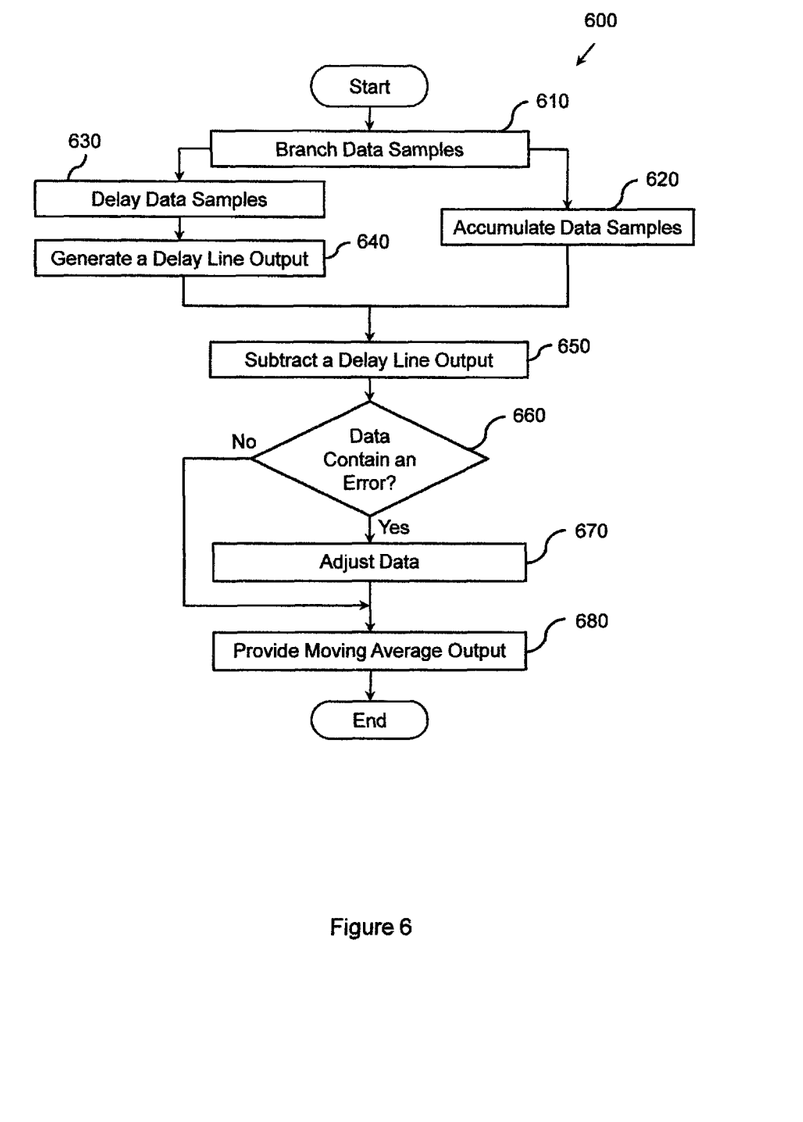
FIG. 6 illustrates another embodiment of a method associated with generating a moving average.

FIG. 6 illustrates an embodiment of a method 600 associated with generating a moving average output. The method 600 may perform some of the operations that apparatuses 200, 300, and 400 (FIGS. 2, 3, and 4) perform. The method 600 improves the generation of a moving average by removing or correcting a corrupted data sample in the moving average output. The corrupted data sample is removed or corrected soon after the corrupted data sample is detected so the corrupted data sample does not contribute significantly to the moving average output. The corrupted data sample is detected in parallel with other method 600 operations so that a moving average output is not delayed.

The method 600 branches, at 610, a most recent M data samples into a first branch and a second branch. The most recent M data samples are inputs from a stream of data samples. The M data samples are sequential samples of a sliding window of samples, as discussed above. The most recent M data samples branched to the first branch are the same as the most recent M data samples branched to the second branch.

The most recent M data samples of the first branch are accumulated at 620. The most recent M data samples are accumulated to a first accumulator of a moving average filter. In one embodiment, the accumulator may be implemented with an adder and a register. The most recent M data samples are added by the adder and stored in the accumulator. On another clock a new data sample is received and added by the adder to the register value. The oldest M data sample is subtracted from the register value when the new data sample is received.

The most recent M data samples of the second branch are delayed, at 630, using a delay line. In one embodiment, the delay line is a string of back-to-back registers. At regular clock intervals, the data samples are clocked form one register to the next in the same sequence the data sample where received. A data sample is clocked out of the last register and into the accumulator when the data sample reach the end of the delay line.

The method 600 generates a delay line output at 640. The delay line output is generated by delaying a data sample of the most recent M data samples of the second branch. The delay line output is delayed by M data samples in the delay line. The delay line output may be delayed by clocking a delay line output through a series of M flip-flops as discussed in the previous paragraph.

At 650, the delay line output is subtracted from the first accumulator. The delay line output may be subtracted from a register holding the accumulated value as discussed above. The subtraction assures the moving average output represents the most recent M data samples.

A determination is made at 660 concerning whether an input data sample contains an error. The determination is made by looking at parity bits associated with the input data sample. The determination may be made in other ways. For example, the determination may involve detecting an overflow bit. The overflow bit may have been set by a process prior to the input data sample arriving in the method 600 as discussed above with reference to FIG. 5. The error may be a bit error, a parity bit error, or another type of error.

The input data sample containing the error is adjusted at 670. The adjustment is made while the input data sample is still in the delay line. Adjusting the input data sample, at 670, is performed in parallel with delaying the most recent M data samples at 630. In one embodiment, the input data sample is adjusted, at 670, by correcting the error upon determining that the input data sample contains an error. The error is corrected by an ECC, a LDPC, or another error correction algorithm. The input data sample containing the error is adjusted, at 670, by replacing the input data sample containing the error with a corrected value.

In one embodiment, the method 600 adjusts the input data sample containing the error by setting the input data sample containing the error to zero. The input data sample containing the error does not contribute to the moving average output when the input data sample is zeroed out. The input data sample with the error may be removed from the moving average output if the input data sample has already contributed to the moving average output.

A moving average output is provided at 680. In one embodiment, the moving average output is a function of a first accumulator output. The first accumulator output is based, at least in part, on the adjusted input data sample. The first accumulator output is an average value related to the most recent M data samples that were accumulated by the first accumulator.

In one embodiment, the moving average output is compensated for when the input data sample contains an error. The moving average output is compensated for by calculating the moving average output with a remaining most recent M data samples after the input data sample containing the error is removed from the most recent M data samples. In another embodiment, the moving average output is compensated for by removing the input data sample containing the error from a process used to calculate the moving average output.

Figure 7:
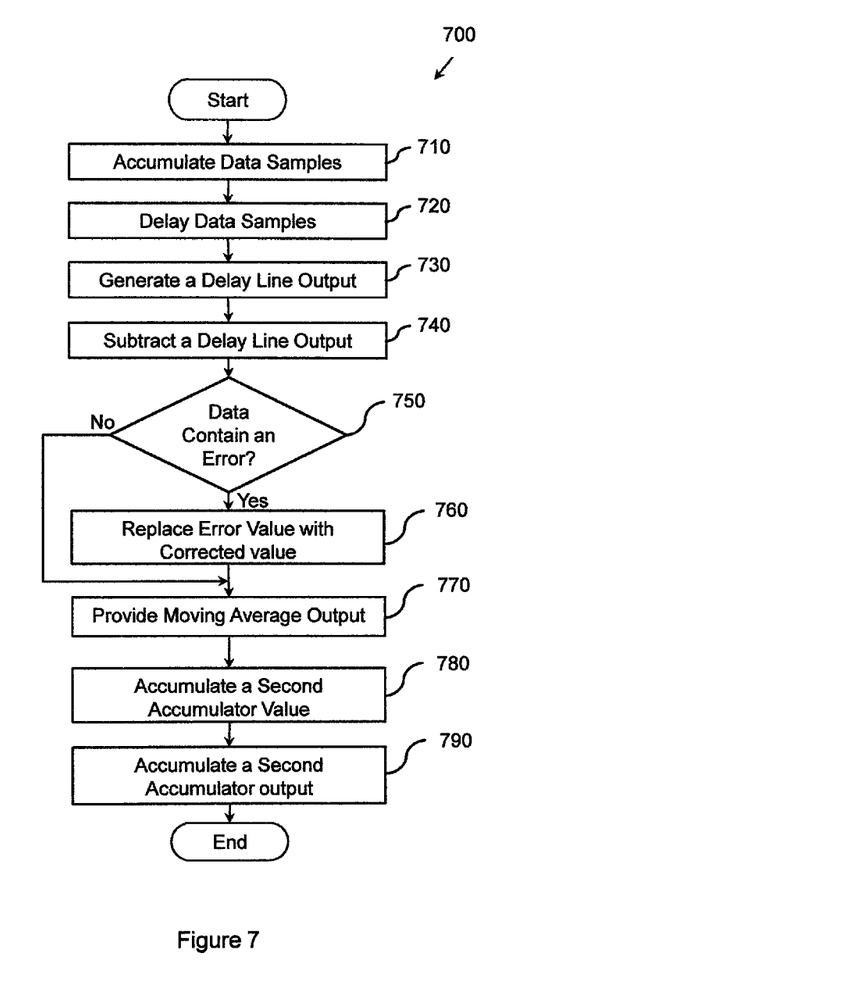
FIG. 7 illustrates another embodiment of a method associated with generating a moving average.

FIG. 7 illustrates an embodiment of a method 700 associated with generating a moving average output. The method 700 may perform some of the operations that apparatuses 200, 300, and 400 (FIGS. 2, 3, and 4) perform. The method 700 improves the generation of a moving average by removing or correcting a corrupted data sample from the moving average output. The corrupted data sample is removed or corrected soon after the corrupted data sample is detected so the corrupted data sample does not contribute significantly to the moving average output. The corrupted data sample is detected in parallel with other method 700 operations so that a moving average output is not delayed.

The method 700 performs some actions similar to the method 600 of FIG. 6. The method 700 accumulates and delays the most recent M data samples, at 710 and 720, as described above. The data samples are used to generate a delay line output at 730 similar to method 600. Like method 600, the delay line output is subtracted from the first accumulator at 740. At 750 a determination is made to determine whether an input data sample contains an error. The determination, at 750, is performed similar to the determination of method 600 and the determination, at 750, may detect similar types of errors.

The input data sample containing the error is replaced with a corrected value at 760. The replacement is made while the input data sample is still in the delay line. The replacement of the input data sample, at 760, is performed in parallel with delaying the most recent M data samples at 720. The error is corrected by an ECC, a LDPC, or another error correction algorithm. The error is corrected soon after the data sample associated with the error becomes a most recent M data sample so that the error does not significantly contribute to the accumulated value.

A moving average output is provided at 770. In one embodiment, the moving average output is a function of a first accumulator output. The first accumulator output is based, at least in part, on the adjusted input data sample. The first accumulator output is a value related to the most recent M data samples that were accumulated by the first accumulator The method 700 accumulates the first accumulator output into a second accumulator at 780. A delayed second accumulator output is also accumulated by the second accumulator at 790. The delayed second accumulator output is delayed by one data sample. The delayed second accumulator output is the moving average output. The second accumulator output subtracts the previous moving average output so that the current moving average output represents the moving average of the most recent M data samples.

In one embodiment, the method 700 is implemented in a chip. A chip is a set of micro-miniaturized electronic circuits fabricated on a piece of semiconductor material. The chip may implement a portion of a read channel.

It will be appreciated that in one embodiment, the methods herein may be implemented as computer executable instructions embodied and stored on a computer-readable medium. When executed by a machine (e.g., processor, device) the instructions cause the machine to perform the methods herein and their equivalents. The methods can also be implemented with circuits.

Figure 8:
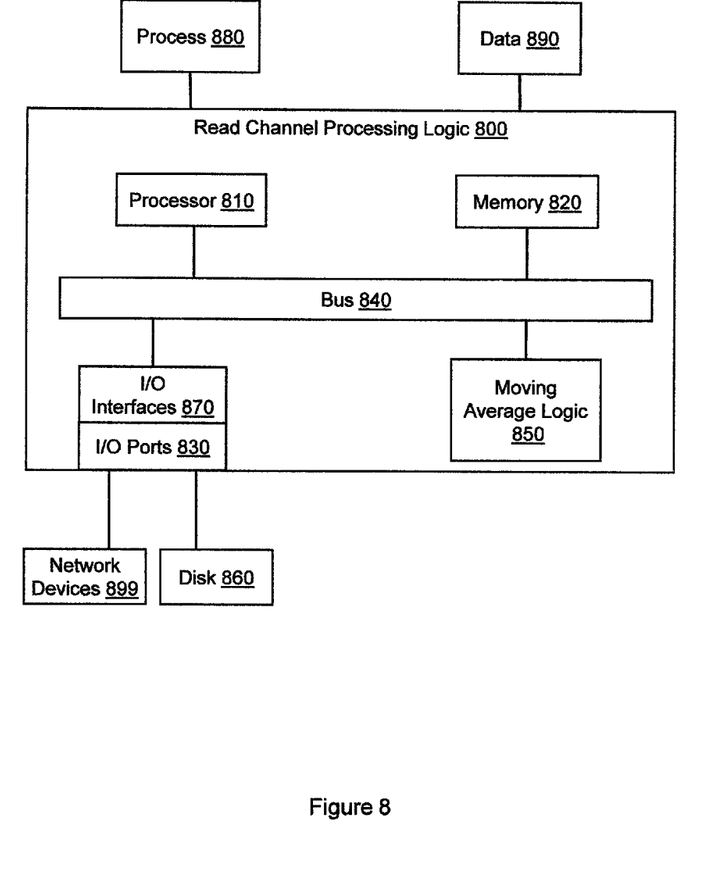
FIG. 8 illustrates an embodiment of a computing environment in which example systems and methods, and equivalents associated with generating a moving average may be implemented.

FIG. 8 illustrates an example read channel processing logic 800 in which example systems and methods described herein, and equivalents, is implemented. The example read channel processing logic 800 comprises a processor 810, a memory 820, and input/output ports 830 operably connected by a bus 840. In one example, the read channel processing logic 800 comprises moving average logic 850 to access memory.

The moving average logic 850 provides means (e.g., hardware, stored software, firmware) for calculating a moving average. The moving average logic 850 can be implemented similar to the apparatus 200, 300, and 400, and/or combinations of their features. The moving average logic 850 can include logic implemented, for example, as an ASIC or other type of circuit.

Generally describing an example configuration of the read channel processing logic 800, the processor 810 may be a variety of various processors including dual microprocessor and other multi-processor architectures. A memory 820 may include volatile memory and/or non-volatile memory. Non-volatile memory may include, for example, read-only memory (ROM), programmable read only memory (PROM), erasable programmable read only memory (EPROM), electronically erasable programmable read only memory (EEPROM), and so on. Volatile memory may include, for example, random access memory (RAM), static random access memory (SRAM), dynamic random access memory (DRAM), and so on.

A disk 860 may be operably connected to the read channel processing logic 800 via, for example, through an input/output interface (e.g., card, device) 870 and the input/output port 830. The disk 860 may be, for example, a magnetic disk drive, a solid state disk drive, a floppy disk drive, a tape drive, a Zip drive, a flash memory card, a memory stick, and so on. Furthermore, the disk 860 may be a compact disk read-only memory (CD-ROM) drive, a compact disk recordable (CD-R) drive, a compact disk rewritable (CD-RW) drive, a digital video disk read-only memory (DVD ROM), and so on. The memory 820 can store a process 880 and/or a data 890, for example. The disk 860 and/or the memory 820 can store an operating system that controls and allocates resources of the read channel processing logic 800.

The bus 840 may be a single internal bus interconnect architecture and/or other bus or mesh architectures. While a single bus is illustrated, it is appreciated that the read channel processing logic 800 may communicate with various devices, logics, and peripherals using other busses (e.g., peripheral component interconnect express (PCIS), 1394, universal serial bus (USB), Ethernet). The bus 840 can be types including, for example, a memory bus, a memory controller, a peripheral bus, an external bus, a crossbar switch, and/or a local bus.

The read channel processing logic 800 may interact with input/output devices via the input/output (I/O) interfaces 870 including the moving average logic 850 and the input/output ports 830. Input/output devices may be, for example, a keyboard, a microphone, a pointing and selection device, cameras, video cards, displays, the disk 860, the network devices 899, and so on. The input/output ports 830 may include, for example, serial ports, parallel ports, and USB ports.

The read channel processing logic 800 can operate in a network environment and thus may be connected to the network devices 899 via the I/O interfaces 870, and/or the I/O ports 830. Through the network devices 899, the read channel processing logic 800 may interact with a network. Through the network, the read channel processing logic 800 may be logically connected to remote computers. Networks with which the read channel processing logic 800 may interact include, but are not limited to, a local area network (LAN), a wide local area network (WLAN), a wide area network (WAN), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

Previous Disclaimers Rescinded

Applicant respectfully informs the Patent Office that the present disclosure is a broadening continuation. Applicant rescinds all disclaimers made during the prosecution of the parent application(s), which may have included statements or amendments that may have disclaimed scope. Accordingly, the previous disclaimers, and the prior art that it was made to avoid, may need to be and should be re-visited.

What is claimed is:

1. A method, comprising:
   calculating, using at least an accumulator, an average value of M sequential data values, where M is an integer;
   delaying the M sequential data values before passing a delay output;
   detecting a data value with an error in the M sequential data values that are delayed; and
   controlling the accumulator to correct the average value of the M sequential data values as a function of the error.

2. The method of claim 1, where the error is compensated for after N clock periods of receiving the data value with the error, and where N is less than M.

3. The method of claim 2, where the error affects the average value for the N clock periods, and the average value is unaffected by the error for M-N clock periods.

4. The method of claim 1, where correcting the average value as a function of the error comprises removing the data value with the error from the M sequential data values.

5. The method of claim 1, where correcting the average value as a function of the error comprises replacing the data value with the error with an average value of data values of the M sequential data values that do not contain an error.

6. The method of claim 1, further comprising:
   branching, from a stream of data samples, a most recent M data samples into a first branch and a second branch, where the most recent M data samples branched to the first branch are the same as the most recent M data samples branched to the second branch;
   accumulating the most recent M data samples of the first branch to a first accumulator of a moving average filter;
   delaying the most recent M data samples of the second branch using a delay line;
   generating a delay line output by delaying a data sample of the most recent M data samples of the second branch, where the delay line output is delayed by M data samples in the delay line;
   subtracting the delay line output from the first accumulator;
   determining an input data sample contains an error;
   adjusting the input data sample containing the error in the delay line, where adjusting the input data sample containing the error is performed in parallel to delaying the most recent M data samples; and
   providing a moving average output as a function of a first accumulator output, where the moving average is used as the average value of a sliding window of the M sequential data values, where the first accumulator output is based, at least in part, on the adjusted input data sample.

7. The method of claim 1, where correcting the average value of the M sequential data values is performed before the data value with the error exits a sliding window of the M sequential data values.

8. An apparatus, comprising:
- accumulator logic implemented in at least hardware configured to accumulate a sequential stream of data values and to generate an accumulator value that spans M sequential data values;
- single delay logic implemented in at least hardware configured to delay the sequential stream of data values and to output a single delay output;
- multiple delay logic implemented in at least hardware configured to receive the single delay output and to hold the single delay output for M clock cycles before passing the single delay output to a multiple delay output;
- event detection logic implemented in at least hardware configured to detect a corrupted single delay output; and
- correction logic implemented in at least hardware configured to control the accumulator logic to adjust a moving average output of the accumulator logic as a function of the corrupted single delay output.

9. The apparatus of claim 8, where the event detection logic is to zero out the corrupted single delay output, and where the event detection logic is to input the zeroed out corrupted single delay output into the multiple delay logic instead of the corrupted single delay output.

10. The apparatus of claim 8, further comprising:
- branch logic implemented in hardware configured to branch the sequential stream of data values to a first branch and a second branch;
- wherein the accumulator logic is configured to accumulate the sequential stream of data values on the first branch; and
- wherein the single delay logic is configured to delay the sequential stream of data values on the second branch.

11. The apparatus of claim 8, where the event detection logic is to detect the corrupted single delay output while the corrupted single delay output is in the single delay logic.

12. The apparatus of claim 8, where the correction logic is configured to control the corrupted single delay output to be subtracted from the accumulator logic.

13. The apparatus of claim 8, where the event detection logic is configured to detect that the single delay output contains an error, and to correct the error to produce a corrected single delay output.

14. The apparatus of claim 13, where the correction logic is configured to control the accumulator logic to adjust the moving average output by subtracting the single delay output that contains the error from the accumulator value, and where the correction logic controls the accumulator logic to add the corrected single delay output to the accumulator value.

15. The apparatus of claim 8, wherein the event detection logic is configured to detect that the corrupted single delay output includes an error that is a bit error or a parity bit error.

16. The apparatus of claim 8, where the event detection logic is configured to detect that the single delay output contains an error as a function of detecting an overflow bit.

17. The apparatus of claim 8, where the event detection logic is to mark the corrupted single delay output, and where the accumulator logic is to adjust the moving average output as a function of the marked corrupted single delay output.

18. The apparatus of claim 8, where the event detection logic is to replace the corrupted single delay output with an average of other data values in the multiple delay logic, where the other data values in the multiple delay logic are data values that are not corrupted.

19. The apparatus of claim 8, where the apparatus implements a read channel in a chip.

20. An apparatus, comprising:
- an accumulator configured to calculate an average value of M sequential data values, where M is an integer;
- delay line logic implemented in at least hardware configured to delay the M sequential data values before passing a delay output;
- error correction logic implemented in at least hardware configured to detect a data value with an error in the M sequential data values that are delayed; and
- correction logic implemented in at least hardware configured to control the accumulator to correct the average value of the M sequential data values as a function of the error.

* * * * *